United States Patent [19]

O'Toole et al.

[11] Patent Number: 4,639,356

[45] Date of Patent: Jan. 27, 1987

[54] HIGH TECHNOLOGY CERAMICS WITH PARTIALLY STABILIZED ZIRCONIA

[75] Inventors: Michael P. O'Toole; Roger J. Card, both of Stamford, Conn.

[73] Assignee: American Cyanamid Company, Stamford, Conn.

[21] Appl. No.: 795,288

[22] Filed: Nov. 5, 1985.

[51] Int. Cl.$^4$ .............................................. C01G 25/02
[52] U.S. Cl. ...................................... 423/266; 423/608
[58] Field of Search ........................ 423/265, 266, 608

[56] References Cited

U.S. PATENT DOCUMENTS

| | | | |
|---|---|---|---|
| 3,415,252 | 5/1970 | Leuy et al. | 423/608 |
| 4,365,011 | 12/1982 | Bernard | 423/266 |
| 4,501,818 | 2/1985 | Rossi | 423/608 |
| 4,520,114 | 5/1985 | David | 423/266 |

FOREIGN PATENT DOCUMENTS 176127  10/1983  Japan .................................. 423/266

*Primary Examiner*—H. T. Carter
*Attorney, Agent, or Firm*—Henry C. Jeanette; Michael J. Kelly

[57] ABSTRACT

A process for making a fully or a partially stabilized zirconia is disclosed. The process comprises making an aqueous solution of zirconium sulfate in admixture with an inorganic or organic water soluble salt of one or more metals selected from the group consisting of Be, Mg, Ca, Sr, Ba, Ra, Sc, Y, La, Ac, Ce, Hf, Th and Al. The aqueous solution is atomized into a solvent at least partially miscible with water with the solvent being agitated during the addition of the solution. The coprecipitated metal salt formed is separated from the solvent, washed with inert solvent or solvents, dried, and calcined.

25 Claims, 3 Drawing Figures

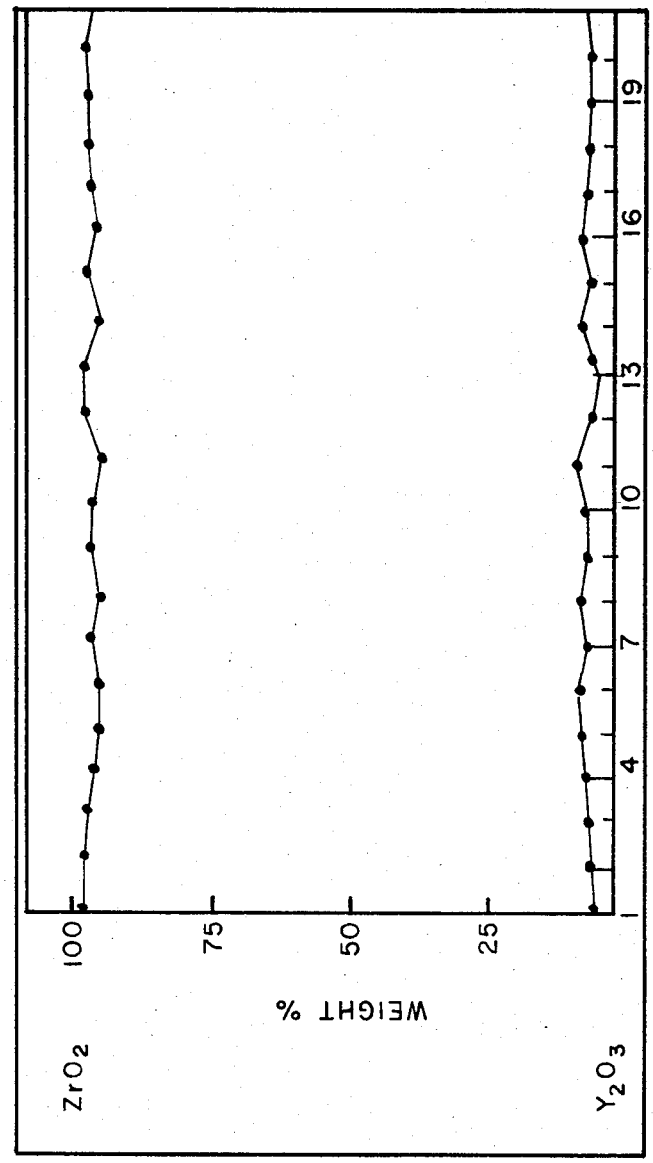

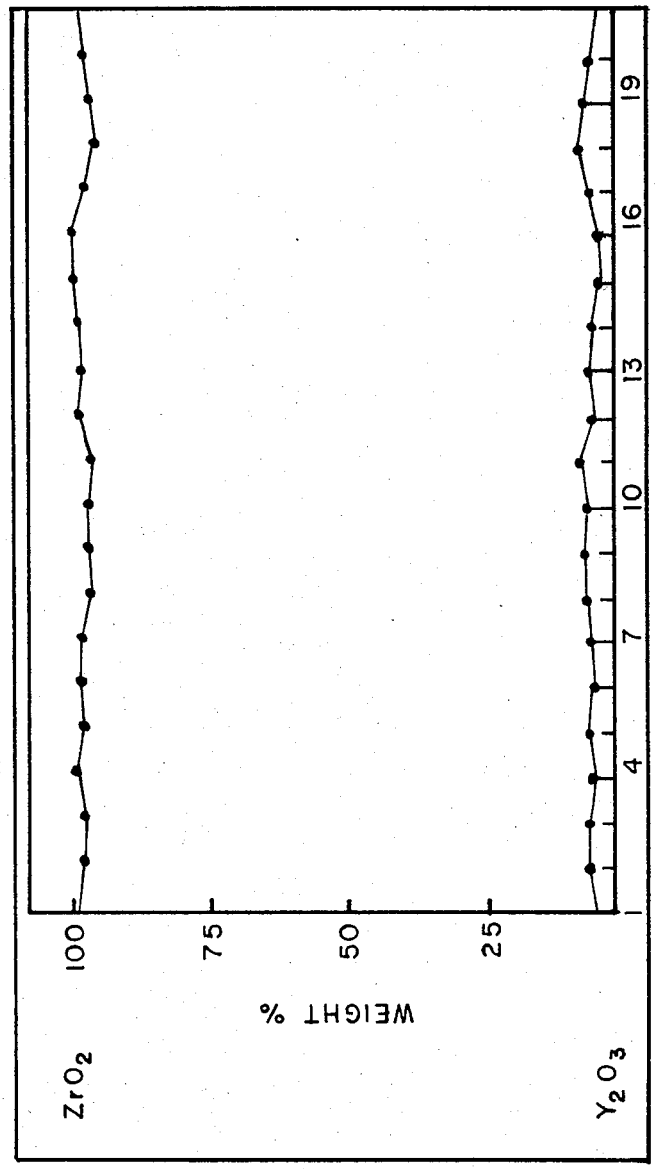

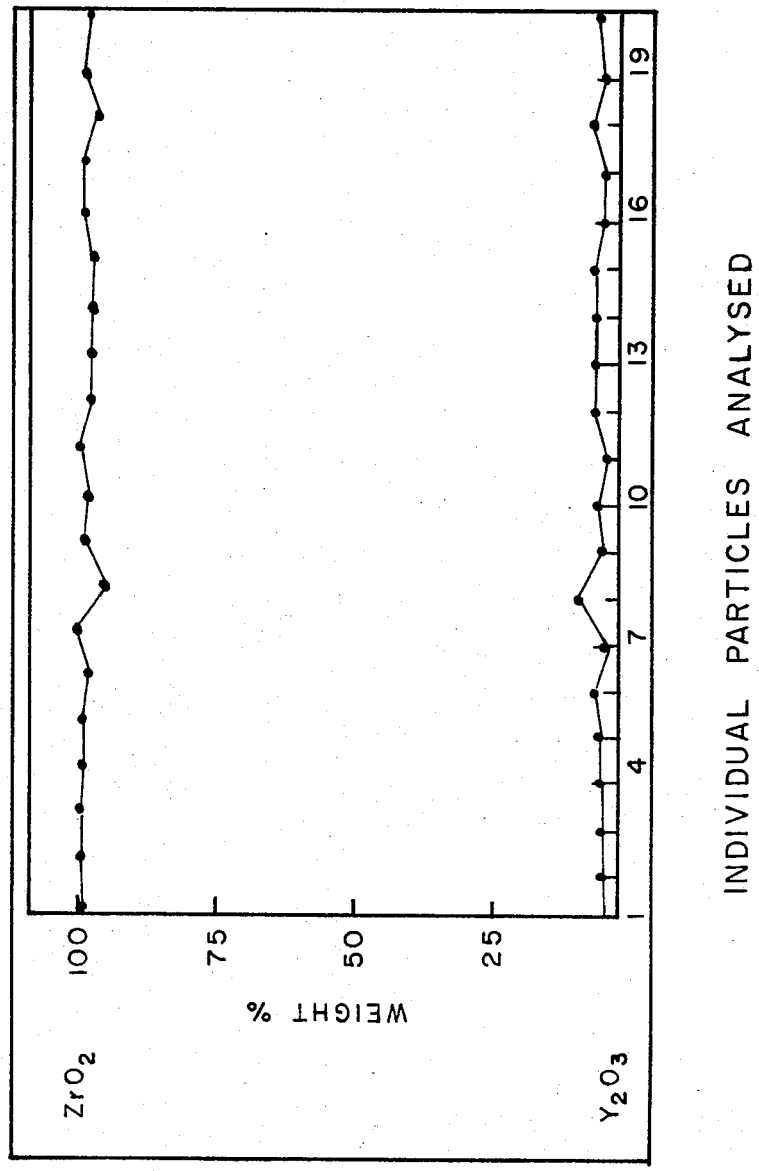

HIGH TECHNOLOGY CERAMICS WITH PARTIALLY STABILIZED ZIRCONIA

FIELD

This invention relates to high technology ceramics. More specifically, this invention relates to fully stabilized zirconia (FSZ) and to partially stabilized zirconia (PSZ) having very high chemical uniformity.

BACKGROUND OF THE INVENTION

Zirconia and mixtures of zirconia with other inorganic oxides are beginning to receive a great deal of attention as ceramic materials. These materials combine toughness with a high tolerance for rapid temperature changes. Because of their unique properties zirconia based materials are already finding application as high temperature furnace insulation, casting dies, pressure nozzles and thread guides. Potential future applications include engine parts, medical prosthesis and electronic materials.

Zirconia ($ZrO_2$) exists in three polymorphic crystal structures between room temperature and its melting temperature. Pure zirconia is rarely used as a ceramic material. The martensitic tetragonal to $$\text{Monoclinic } ZrO_2 \underset{\longleftarrow}{\overset{1100° C.}{\longrightarrow}} \text{Tetragonal } ZrO_2$$

$$\text{Tetragonal } ZrO_2 \xrightarrow{2400° C.} \text{Cubic Fluorite Structure}$$

monoclinic phase transformation at approximately 1100° C. is diffusionless, athermal and reversible. The 3.25% volume expansion results in catastrophic failure of pure zirconia materials at >1000°C.

Other oxides are added to zirconia to form either fully stabilized zirconia or partially stabilized zirconia. The oxides most commonly used are calcia (CaO), magnesia (MgO) and yttria ($Y_2O_3$). Stabilized zirconias result from the addition of enough of these other oxides to form a solid solution with the cubic fluorite structure. Partially stabilized zirconias contain less additives than stabilized zirconias resulting in monoclinic or tetragonal phase zirconia exclusively or as precipitates in the mixed oxide cubic fluorite solid solution. In addition, the temperature of the monoclinic-tetragonal phase transition can be raised to a maximum of approximately 1230° C. by the addition of hafnia to zirconia.

Fully stabilized zirconias have good ion conductivity and can be used as solid electrolytes. However, their high thermal expansion and low thermal conductivity results in poor thermal resistance.

Partially stabilized zirconia typically contains 15-50% unstabilized zirconia crystallites. These materials have good thermal shock resistance. They have low thermal conductivity, low coefficient of friction against steel and good resistance to damage from machining. They often toughen on grinding and sinter to near theoretical density. Unlike fully stabilized zirconia, PSZ has low ionic conductivity and electromagnetic transmissibility.

Zirconium dioxide (zirconia) exists as the naturally occurring minerals baddeleyite and endialite. Zircon ($ZrSiO_4$ or $ZrO_2.SiO_2$) also occurs naturally as zirconia silicate ($ZrSiO_4$) in zircon sand. A variety of methods have been developed for processing zircon sand. The sand can be chlorinated at 1100° C. to produce zirconium chloride:

$$ZrSiO_4 + 4C + 4Cl_2 \xrightarrow{1100° C.} ZrCl_4 + SiCl_4 + 4CO$$

Zircon sand can be converted to zirconia in a plasma process:

$$ZrSiO_4 \xrightarrow{300 \text{ KW Plasma}} ZrO_2 + SiO_2$$

Pure zirconia (approximately 99%) can be prepared by caustic leaching of silica from the product mixture. Zirconium chloride and zirconium dioxide are the most commonly used precursors for partially stabilized zirconias.

The most energy intensive method of preparing PSZ involves melting and cooling a mixture of the appropriate oxides. This route yields the highest quality PSZ crystals obtained to date.

Zirconia and PSZ powders have been prepared by hydrothermal processes. Single-phase monoclinic zirconia powders have been prepared by hydrothermal treatment of amorphous hydrated zirconia with 8 wt % aqueous KF. The reaction is performed at 100 MPa (14,000 psi), 200°-500° C. for 24 hours to yield 16-22 mm powders. Yttria stabilized cubic zirconia crystals have been prepared hydrothermally at 650°-750° .C and 15,000-22,000 psi.

Yttria stabilized zirconia has been prepared by the hydrolysis of a mixture of zirconium isopropoxide and yttrium isopropoxide. Calcination of the mixed oxide powders is required to obtain the PSZ. PSZ layers can also be obtained from plasma sprayed powders.

PSZ ceramic articles have historically been prepared by sintering mixtures of zirconium oxides with the desired stabilizing oxide. This process generally results in the formation of inhomogenous products with limited strength. It is advantageous to prepare the finished ceramic from a specially prepared PSZ powder.

The usual method of preparing yttria —PSZ powder is the coprecipitation of yttria and zirconia using ammonia. Typical reaction proceeds as follows:

$$ZrOCl_2(aq) + YCl_3(aq) \xrightarrow{NH_4OH}$$

$$ZrO(OH)_2 + Y(OH)_3 \longrightarrow ZrO_2 + Y_2O_3$$

The major problems with this procedure are that the powder obtained is usually not chemically homogeneous and that the powder size is not fine, uniform, or of narrow size distribution.

Partially stabilized zirconias possess a variety of physical properties which make them very attractive for demanding, high technology ceramic products. Their chemical inertness, high strength, thermal stability and tolerance of thermal shocks are responsible for their use in high temperature furnace insulation, casting dies, pressure nozzles and thread guides. Major potential applications include ceramic engine parts and electronic materials.

One of the most attractive potential applications for partially stabilized zirconia is in engine applications. In the conditions of high thermal flux in gas turbines, the thermal stress due to the large coefficient of thermal expansion restricts the use of zirconia to thin coatings or low density insulative parts which can tolerate cracking. The unusual toughness and low thermal conductivity of PSZs makes them more attractive for diesel engine applications where the temperature does not exceed 1000° C.

Zirconia based ceramics are used as sensors in harsh environments such as monitoring automobile exhaust. Zirconia based materials are also used as thermistors and piezoelectric components. Due to the increasingly high demand for partially stabilized zirconias for use in high technology ceramic products, there exists a need for PSZ of very high chemical uniformity having spherical particles of uniform size and submicron diameter. A PSZ having these properties would yield ceramics having a highly pure and uniform density wherein the pores between the spherical particles close uniformly during ceramic formation. Heretofore, such a PSZ has not been readily available. This invention now provides such a PSZ and a process for making such PSZ as well as a FSZ.

BRIEF DESCRIPTION OF THE DRAWING

FIGS. I, II and III demonstrate particle to particle uniformity obtained by the process of this invention.

SUMMARY OF THE INVENTION

This invention provides a process for the production of a fully or a partially stabilized $ZrO_2$ comprising:

(a) making an aqueous solution of zirconium sulfate in admixture with an inorganic or organic salt of one or more metals selected from the group consisting of Be, Mg, Ca, Sr, Ba, Ra, Sc, Y, La, Ac, Ce, Hf, Th, and Al, said organic salt having from about 1 to about 20 carbon atoms;

(b) atomizing said solution into a solvent at least partially miscible with water (e.g., a solvent having a solubility parameter of about 9.5 to about 14 $(cal/cm^3)$) present in an amount of at least 3 times the volume of said solution such that the ratio of said solution to said solvent is about 1:3 to about 1:50, said solvent being agitated during the addition of said solution, forming a coprecipitated metal salt;

(c) separating said coprecipitated metal salt from said solvent;

(d) washing said separated coprecipitated metal salt with an inert solvent;

(e) drying said washed coprecipitated salt; and (f) calcining said dried coprecipitated salt in a flowing gas or mixture of gases.

This invention also provides a fully or a partially stabilized zirconia comprising:

(a) zirconium dioxide (zirconia, $ZrO_2$) in an amount of about 75 to about 99% by weight, based on the total weight of the PSZ or FSZ, with about 80 to about 98 being preferred; and (b) an oxide of one or more metals selected from the group consisting of Be, Mg, Ca, Sr, Ba, Ra, Sc, Y, La, Ac, Ce, Hf, Th, and Al with Y, Mg and Ca being preferred and Y being most preferred, said oxide being present in an amount of about 1 to about 25% by weight, based upon the total weight of the PSZ or FSZ, with about 2 to about 20 being preferred.

wherein (a) and (b) are in admixture as a solid solution in individual particles with each particle approximating a sphere in shape and each particle having a diameter of about 4 to about 1000 nm with about 4 to about 200 being preferred; wherein each of said particles have a uniform chemical composition of about 75 to about 99% by weight, based on the weight of said particle, of (a), with about 80 to about 98 being preferred, and about 1 to about 25% by weight, based on the weight of said particle, of (b), with about 2 to about 20 being preferred; and wherein the PSZ has a green density of about 1.8 to about 3.0 g/cc with greater than 2.5 g/cc being preferred.

DETAILED DESCRIPTION OF THE INVENTION

In the processes of this invention, FSZ or PSZ is produced from zirconium sulfate and inorganic or organic water soluble salts of one or more metals selected from the group consisting of Be, Mg, Ca, Sr, Ba, Ra, Sc, Y, La, Ac, Ce, Hf, Th, and Al. It is contemplated that the other members of the Lanthanum and Actinium series may also be used. The inorganic salts are selected from the group consisting of oxides, sulfates, chlorides, nitrates, perchlorates, and the like. The organic salts are derived from organic acids (e.g. carboxylic acids, hydroxy acids, and the like), saturated or unsaturated, substituted or unsubstituted, having about 1 to about 40 carbon atoms with about 1 to about 20 being preferred. Examples include but are not limited to the following acids: formic (formate); acetic (acetate); propionic (propionate); butyric (butyrate); valeric (valerate); caproic (caproate); caprylic (caprylate); capric (caprate); lauric (laurate); myristic (myristate); palmitic (palmitate); stearic (stearate); oleic (oleate); linoleic (linoleate); linolenic (linolenate); cyclohexanecarboxylic (cyclohexanecarboxylate); benzoic (benzoate); o-, m- and p- toluic (toluate); o-, m- and p- chlorobenzoic (chlorobenzoate); terephthalic (terephthalate); glycolic (glycolate); lactic (lactate); 2-hydroxybutryic (2-hydroxybutryate); mandelic (mandelate); glyceric (glycerate); malic (malate); tartaric (tartarate); citric (citrate); oxalic (oxalate); malonic (malonate); succinic (succinate); glutaric (glutarate); adipic (adipate); pimelic (pimelate); suberic (suberate); azelaic (azelate); sebacic (sebacate); maleic (maleate); fumaric (fumarate); trimellitic (trimellitate); trimesic (trimesate); and the like.

Of the inorganic salts it is preferred to use the sulfates. Of the organic salts it is preferred to use the acetates, formates, and citrates.

Preferably, the metals that form the salts that are coprecipitated in solid solution with the zirconium sulfate are selected from the group consisting of Y (yttrium), Mg or Ca. Of these three each has its own advantages and range of applications relative to the end use of the PSZ or FSZ produced. For example, Y is preferred for high temperature applications. Mg is preferred over Ca for other applications because Mg has a lower volatility.

The salts can be dissolved separately to make their own solution and the solutions mixed to form one solution or, more conveniently, the salts can be dissolved in one solution, without having first dissolved them individually in their own solution. Generally, purified water is used to make the aqueous solutions to avoid interference or interaction with other ions which may be present in the water. Examples of purified water include distilled, deionized or millipore filtered (e.g., through a filter having a pore size in the range of about 0.2 μm to about 10 μm) water with distilled being preferred and millipore filtered being most preferred.

The individual salt solutions before mixing to form one solution or the single solution with all salt components dissolved therein are preferably filtered through a millipore filter having a pore size in the range of about 0.2 μm to about 10 μm, with about 0.2 to about 3 being preferred, to remove unwanted particulate matter and, without wishing to be bound by theory, this provides for homogeneous nucleation. The salts are mixed together in solution by any suitable means known to those skilled in the art for thoroughly dispersing the solutes, including, for example, ultrasonic vibration, mechanical stirring, magnetic stirring and the like.

The amounts of the salt in the aqueous solution can vary from about 0.1 to about 2.5 molar for the zirconium sulfate, with about 1 to about 2.5 being preferred; and from about 0.001 to about 1.3 molar for the coprecipitant, with about 0.05 to about 0.5 being preferred. The amount of these salts are so chosen in accordance with the amount of each salt desired in the FSZ or PSZ product.

Generally, the amount of zirconium oxide (derived from the zirconium sulfate) is from about 75 to about 99% by weight based on the weight of product oxide, with about 80 to about 98 being preferred. This corresponds to an amount of zirconium sulfate in the mixed salt solution of about 0.1 to about 2.5 moles/liters with about 1 to about 2.5 being preferred. The amount of coprecipitant salt is generally about 1 to about 25% by weight based on product oxide, with about 2 to about 20 being preferred. This corresponds to an amount of the coprecipitant salt in the mixed salt solution of about 0.001 to about 0.8 moles/liters, with about 0.01 to about 0.5 being preferred.

In general the solutions are prepared at a temperature, such as room temperature, suitable for dissolving the salt being utilized. If desired slightly elevated temperatures (e.g., about 30° to about 80° C.) may be used to more conveniently dissolve the salt being utilized.

The mixed solution of salts is then delivered into a solvent at least partially miscible with water in the form of fine droplets. Generally this is accomplished by atomizing or spraying the solution into the solvent to produce a fine mist. The atomized solution is produced, for example, by the interaction of a liquid passing through a nozzle in conjunction with pressurized gas or ultrasonic vibrations. Such nozzles are commercially available, as for example a Siphon Solid Cone Air Atomizing Nozzle WDA-WDB and an Aspirating Type H-1A, which are dual pressure nozzles obtainable from Delavan Corporation and Bete Fog respectively; or, for example, Model No. 8409-2-35TC or 8308-2-60TC which are utrasonic nozzles obtainable from Sono-Tek. The rate of delivery of the salt solution into the solvent is not a determinitive factor of the desired product obtained and may vary in accordance with the quantity of materials being utilized. Those skilled in the art will be able to vary the delivery rate and still obtain the sought after results without any undue experimentation. More conveniently, the rate of delivery of salt solution into solvent is predetermined by the nature and design of the delivery device utilized.

The droplet size of the delivered salt solution can effect the size of the particles and the content of the FSZ or PSZ. For example, in three ethanol dehydrations in the production of $Y_2O_3$-PSZ smaller droplets of salt solution resulted in smaller particles and a higher $Y_2O_3$ content in the $Y_2O_3$-PSZ. This may be explained, without wishing to be bound by theory, by more rapid precipitation of the salts from the smaller droplets. Therefore, particle size and salt, e.g., yttria (i.e., $Y_2O_3$), content can be controlled by the size of the droplets and hence the delivery method. Such delivery methods are amply exemplified heretofore and any variations in them are well within the capabilities of those skilled in the art without undue experimentation.

The solution, as previously stated, is delivered into a solvent at least partially miscible with water. The solvent utilized is capable of drying the droplets of salt solution by rapidly removing water while the remaining metals coprecipitate forming a dry precipitated powder (coprecipitated metal salt). Therefore, the solvent utilized has sufficient water miscibility to prevent the separation of the water from the delivered salt solution into a second phase, but is not so miscible as to adversely effect the precipitation of the FSZ or PSZ. In general, for example, solvents which are utilizable have a polarity having a dipole moment of about 1.6 to about 4.0 debyes. Examples of utilizable solvents include for example: alcohols and mixtures thereof having 1 to about 8 carbon atoms, with about 2 to about 4 being preferred and mixtures thereof; ketones and mixtures thereof having about 3 to about 8 carbon atoms, with about 3 to about 5 being preferred; cyclic or acyclic hetero atom containing compounds and mixtures thereof having about 2 to about 12 carbon atoms, with about 2 to about 8 being preferred, and whose hetero atoms are selected from the group consisting of oxygen, nitrogen, and sulfur.

Examples of the aforementioned solvents include but are not limited to: methanol; ethanol; propanol; isopropanol; n-butanol; sec-butanol; isobutanol; amyl alcohol; acetone; methyl ethyl ketone; methyl n-propyl ketone; ethyl ketone; methyl isopropyl ketone; methyl isobutyl ketone; benzyl methyl ketone; acetophenone; benzophenone; tetrahydrofuran; furan; pyrrole; piperazine; morpholine; piperidine; pyrrolidine; 2-picoline; thiophene; dimethyl sulfoxide; dimethyl formamide; and the like.

Amongst the alcohols, ethanol, isopropanol and sec-butanol are preferred; amongst the ketones, acetone is preferred; and amongst the hetero atom containing compounds, tetrahydrofuran is preferred. While alcohols of 8 carbons can be used, it is preferable that alcohols having from about 6 to about 8 carbon atoms be used in admixture with other alcohols having a lower carbon number. This is because alcohols with above 6 carbon atoms tend to be much less miscible with water than lower carbon alcohols.

Of the aforementioned solvents, alcohols are preferred with ethanol and isopropanol being most preferred. The solvent is rapidly agitated, for example, by stirring, mixing, or swirling continuously to insure the most advantagous rapid precipitation of metal salts from the solution droplets. Such agitation can be done by mechanical stirring, magnetic- sitrring or ultrasound. Different techniques of mixing the solvent can result in slight variations in the final FSZ or PSZ product. Some mixing techniques may not be as efficient as others resulting in some larger particle sizes or in a broader particle size distribution in the product. Some techniques may produce heat, such as that produced by an ultrasonic probe. The heat can cause more of a particular salt to dissolve resulting in a product having a lower content of that particular salt. However, such variations may be substantially reduced by insurinq rapid stirring of the solvent.

The ratio of the amount (by volume) of solvent used to the solution added is about 3:1 to about 50:1 and preferably about 5:1 to about 20:1.

It is preferred to maintain a nearly constant water (from the aqueous solution) to solvent ratio during the addition of the salt solution to the solvent. Maintaining a nearly constant water to solvent ratio results in a nearly constant polarity of the solvent, which (without wishing to be bound by theory) is believed to result in a more uniform particle size and chemical distribution. Therefore, it is preferred that fresh solvent be added to the solvent receiving the salt solution during the addition of the salt solution. The fresh solvent is added at a rate of about 3 to about 50 times the rate (based on volume) of the addition of the solution with about 5 to about 20 times the rate being preferred. The additional solvent can be added by means suitable to deliver the desired volume of solvent, e.g., by droplets, driping, injecting, and the like. Addition by continuous stream may also prove useful.

The foregoing steps are conveniently carried out at room temperature, but may if desired be carried out at higher or lower temperatures, e.g., about $-10°$ C. to about $100°$ C. and preferably about $0°$ C. about $60°$ C. without adverse effect on the physical properties of the FSZ or PSZ powder. However, as those skilled in the art will appreciate, due to the effect of temperature on the solubility of a solute, variations in temperatures may cause slight variations in the concentration of the coprecipitant, in the FSZ or PSZ, e.g., $Y_2O_3$ in a $Y_2O_3$-PSZ.

The precipitated powder is then separated from the supernatant, for example by filtration or centrifugation. The separated powder is then washed with an inert solvent, such as, for example acetone. Other solvents for washing the precipitated powder include but are not limited to toluene, n-butanol, ethyl acetate, and the like. The solvents may be used individually, sequentially or as mixtures. For example, a sequential use of acetone and toluene with acetone being used first in the sequence.

The washed powder is then dried for a time and at a temperature sufficient to dry the powder without degrading the powder or causing other adverse chemical or physical changes in the powder. For example, the powder can be dried for a time period of about ½ to about 16 hours at a temperature of about $40°$ to about $150°$ C.; preferably at $60°$ to $120°$ C.

The dried powder is then calcined in a flowing gas or mixtures thereof for a time period and at a temperature which will calcine the powder without causing adverse physical effects. For example, the dried powder can be calcined at a temperature of about $700°$ to about $1100°$ C., preferably about $700°$ to about $900°$ C. and most preferrably at $750°$ to $800°$ C. for a time period of about 1 to about 12 hours, preferably about 1 to about 5 hours and most preferably about 2 hours. The flowing gases that can be utilized include for example air, oxygen, and the like. Most preferably flowing air is used.

FSZ and PSZ differ from each other only in the ratio of metals present. Thus a FSZ is produced when the ratio of metals present results in formation of a solid solution with a cubic fluorite structure whereas a PSZ is produced when higher Zr levels are used. The ratio of metals utilized to produce a FSZ or PSZ are readily determined by reference to phase diagrams for the metals being used.

The following examples are provided for the purposes of illustration only. The examples should not be construed as limiting the invention in any way as variations of the invention are possible which do not depart from the spirit and scope of the appended claims.

In general, in the following examples, the monoclinic phase observed by x-ray diffraction (XRD) was increased in the preparation of the samples for testing. Grinding in a mortar or ultrasonic vibration induces the tetragonal to monoclinic transformation. As an example, when the powder prepared using the Sono-Tek nozzle was ground, $>5-10\%$ monoclinic phase was observed. Smearing the unground powder into the sample holder produced only 5% monoclinic. No monoclinic phase was detected when the powder was sprinkled and gently pressed.

In the examples that follow PSZ are produced.

EXAMPLE 1

To 50 ml water was added 7.1 lg zirconium sulfate tetrahydrate and 0.6 g yttrium sulfate octahydrate. This solution was filtered through a 0.2 μm filter and then sprayed into 0.5 L ethanol using a ceramic nebulizer (Beckman #485857) pressurized by compressed air at 5 to 10 psi. The ethanol solution was mechanically stirred during this process. A white precipitate was formed. The precipitate was collected by filtration and was washed with 0.5 L acetone. The precipitate was dried for 1 hour at $120°$ C. and then calcined in air at $750°$ C. for 2 hours.

The product was a white powder of 5 mole % $Y_2O_3$—$ZrO_2$. The powder was 99% pure, was 90% cubic/tetragonal phase, and was spherical with an average particle size of 40 nm as determined by quasielastic light scattering. Analysis by analytical electron microscopy indicated a narrow yttria distribution of $5\pm1\%$ on a particle by particle basis.

EXAMPLES 2-3

Examples 2 and 3 were performed as in Example 1 except that the reaction temperature was maintained at $0°$ C. or $60°$ C., respectively, instead of room temperature. The product obtained in each of these examples was identical to that of Example 1. These examples demonstrate that this process can be conducted under a wide range of temperatures.

EXAMPLE 4

Example 4 was performed as in Example 1 except the amount of ethanol was increased to 1.0L. The product was identical to that obtained in Example 1 except that the yttria content was 4.6 mole %.

EXAMPLES 5-7

Zirconium sulfate (274.01 g, 0.77 moles) and yttrium sulfate (13.51 g, 0.02 moles) were dissolved in 390 m water. After addition, the solution volume was 530 ml. This solution was filtered through a 0.2 μm filter and then sprayed, using three different nozzles, into 1 to 1.5 liters of rapidly stirred isopropanol. Isopropanol is added at 5 times the rate of the sulfate solution. The total volume of alcohol was 3860 ml. Addition required 40 to 80 minutes.

The metal salts immediately coprecipitated. The slurry was filtered and the precipitate was washed with 2 liters of acetone. The powder was dried for 1½ hours to 2 hours at $120°$ C. and then calcined in flowing air at $750°$ C. for 2 hours. The results are reported in Table I.

TABLE I
EFFECT OF SPRAY NOZZLE ON PSZ

| EXAMPLE | NOZZLE | MOLE % Y₂O₃ | PARTICLE SIZE | CHEMICAL HOMOGENITY* |
|---|---|---|---|---|
| 5 | Air Pressure A** | 3.7 | 20 nm | 2.0–7.6 |
| 6 | Air Pressure B*** | 3.4 | 6 nm | 2.0–5.4 |
| 7 | Ultra-Sonic | 3.6 | 12 nm | 2.3–4.9 |

*Mole % Range of Y₂O₃
**Bete Fog
***Delavan
   Sono-Tek 8308-2-60TC

These results demonstrate how a number of commercial nozzles can be used for this process. The ultrasonic nozzle provides a low pressure spray and results in the best chemical uniformity.

The results of particle by particle analysis by Analytical Electron Microscopy (AEM) of the product produced in accordance with the procedure of Example 7 is given in Table II and graphically represented in FIG. I.

TABLE II
MOLE % Y₂O₃ ON A PARTICLE BY PARTICLE BASIS

| POINT | MOLE % Y₂O₃ |
|---|---|
| 1 | 2.4 |
| 2 | 2.3 |
| 3 | 3.2 |
| 4 | 3.6 |
| 5 | 4.0 |
| 6 | 3.2 |
| 7 | 4.0 |
| 8 | 3.5 |
| 9 | 3.8 |
| 10 | 4.7 |
| 11 | 2.6 |
| 12 | 2.7 |
| 13 | 4.4 |
| 14 | 3.0 |
| 15 | 4.9 |
| 16 | 3.6 |
| 17 | 3.4 |
| 18 | 2.7 |
| 19 | 3.0 |
| 20 | 3.2 |
| AVERAGE | 3.41 |
| STANDARD DEVIATION | 0.73 |

EXAMPLES 8 and 9

Zirconium sulfate (1261.5 g, 3.55 moles) and yttrium sulfate (61.3 g, 0.10 moles) were dissolved in 1.75 liters water. This solution was filtered through a 0.2 μm filter and then sprayed, utilizing two different nozzles, into 3 to 3.5 liters of rapidly mechanically stirred isopropanol. Isopropanol was added at 6 times the rate of the aqueous solution. The total volume of alcohol was 17.5 liter. Addition required 1½ to 2½ hours. The slurry was filtered and the precipitate was washed with 8 liters of acetone. The powder was dried for 2 hours at 120° C. and calcined for 2 hours at 750° C. The results are reported in Table III.

TABLE III
EFFECT OF SPRAY NOZZLE ON PSZ

| EXAMPLE | NOZZLE | Mole % Y₂O₃ | PARTICLE SIZE | CHEMICAL HOMOGENITY* |
|---|---|---|---|---|
| 8 | Air** Pressure | 3.0 | 12 nm | 0–7.0 |
| 9 | Ultra-Sonic*** | 3.6 | 20 nm | 1.6–4.0 |

*Mole % Range of Y₂O₃
**Delavan
***Sono-Tek 8308-2-60TC

The results of a particle by particle analysis of the product produced in accordance with the procedure of Example 9 is given in Table IV and graphically represented in Figure II. The analysis was performed by AEM.

TABLE IV
MOLE % Y₂O₃ ON A PARTICLE TO PARTICLE BASIS

| POINT | MOLE % Y₂O₃ |
|---|---|
| 1 | 2.0 |
| 2 | 2.7 |
| 3 | 2.5 |
| 4 | 2.0 |
| 5 | 2.5 |
| 6 | 2.1 |
| 7 | 2.4 |
| 8 | 3.5 |
| 9 | 3.2 |
| 10 | 3.1 |
| 11 | 4.0 |
| 12 | 2.3 |
| 13 | 2.6 |
| 14 | 2.3 |
| 15 | 1.6 |
| 16 | 1.6 |
| 17 | 2.9 |
| 18 | 3.2 |
| 19 | 2.9 |
| 20 | 2.1 |
| AVERAGE | 2.58 |
| STANDARD DEVIATION | 0.62 |

The Y-PSZ powder, of Example 9, containing about 3.6 mole % of Y₂O₃ was pressed at about 10K PSI to yield a pellet. The green density of the pellet was about 1.86 g/cc. The pellet was sintered at about 1500° C. to yield a pellet of fixed density 5.99 g/cc. If the powder is milled before use the green density could be increased to 2.99 g/cc. If the sintering is optimized there should be obtained a fixed density of about 6.05 g/cc.

EXAMPLE 10

To 50 ml water was added 7.1 g zirconium sulfate tetrahydrate and 0.45 g of calcium formate. This solution was filtered through a 0.2 μ filter and then sprayed into 0.5 L isopropanol using a ceramic nebulizer (Beckman #485857) pressurized by compressed air at 5 to 10 psi. The isopropanol solution was mechanically stirred during the process. A white precipitate was formed. The precipitate was collected by filtration and was washed with 0.5 L acetone. The precipitate was dried for 1 hour at 120° C. and then calcined in air at 750° C. for 2 hours. The product was a white powder of 5.8 weight % CaO. The powder was >90% monoclinic phase with the remaining percentage being cubic/tetragonal phase and was spherical with an average particle size of 11–15 nm as determined by AEM. AEM also indicated a Ca:Zr ratio of 0.01:0.07 on a particle to particle basis.

EXAMPLE 11

The preparation was the same as in Example 10, except 0.19 g calcium citrate tetrahydrate was substituted for calcium formate. The product was a white powder of 5.9 weight % CaO. The powder was spherical with a submicron particle size as determined by SEM (Scanning Electron Microscopy).

EXAMPLE 12

To 50 ml water was added 7.1 g zirconium sulfate tetrahydrate and 1.2 g magnesium citrate. This solution was filtered through a 0.2 μm filter and then sprayed into 0.5 L isopropanol using a ceramic nebulizer (Beckman #485857) pressurized by air at 5 to 10 psi. The isopropanol solution was mechanically stirred during this process. A white precipitate was formed. The precipitate was collected by filtration and was washed with 0.5 L of acetone. The precipitate was dried for 1 hour at 120° C. and then calcined in air at 750° C. for 2 hours. The product was a white powder of 6.9 wt % MgO. The powder was >90% monoclinic phase with the remaining percentage being cubic/tetragonal phase and was spherical with an average particle size of 18-25 nm as determined by AEM. AEM also indicated a Mg:Zr ratio of 0.01:0.23.

EXAMPLE 13

The preparation was the same as in Example 12 except 0.31g of magnesium formate dihydrate was substituted for magnesium citrate. The product was a white powder of 5.8 wt % MgO. The powder was spherical with a submicron particle size as determined by SEM.

EXAMPLE 14

The preparation was the same as in Example 12 except 0.12 g magnesium sulfate was substituted for the citrate. Also, the solvent was 0.5 L acetone instead of isopropanol. The product was a white powder of 6.7 wt % MgO. The powder was spherical with a submicron particle size as determined by SEM.

EXAMPLE 15

In a process similiar to Example 9, 25.3 lbs zirconium sulfate and 1.25 lbs. yttrium sulfate were disolved in 35.1 lbs. millipore filtered water. The resulting solution was filtered and then atomized through an ultrasonic nozzle into a total of 276 lbs. isopropanol. The solution was stirred mechanically. The product was collected by filtration and washed with 7.5 gallons acetone, 3 gallons toluene and then 5 gallons acetone. The product was dried at 60° C. overnight and then calcined at 750° C. for 3 hours to yield 25-75 nm spherical particles with excellent chemical uniformity. The yttria distribution on a particle by particle basis was 2.4±0.7 mole % was for 20 particles as determined by AEM. The results of the particle by particle analysis is given in Table V and graphically represented in Figure III.

TABLE V

| MOLE % $Y_2O_3$ ON A PARTICLE BY PARTICLE BASIS | |
|---|---|
| POINT | MOLE % $Y_2O_3$ |
| 1 | 1.80 |
| 2 | 1.83 |
| 3 | 1.91 |
| 4 | 2.05 |
| 5 | 2.01 |
| 6 | 2.67 |
| 7 | 1.47 |
| 8 | 4.42 |
| 9 | 2.07 |
| 10 | 2.31 |
| 11 | 1.58 |
| 12 | 2.96 |
| 13 | 2.93 |
| 14 | 2.81 |
| 15 | 3.01 |
| 16 | 2.13 |
| 17 | 2.02 |
| 18 | 3.26 |
| 19 | 2.02 |
| 20 | 2.39 |
| AVERAGE | 2.38 |
| STANDARD DEVIATION | 0.70 |

COMPARATIVE EXAMPLES

EXAMPLES 16-19

Comparative Examples 16-19 were conducted as described in Example 1 with the exceptions that solvents other than ethanol were used. The aqueous salt solution was added dropwise and the mixing was by ultrasonication. The results obtained are reported in Table VI.

These results show the effects of differing solvent polarity on the yttria and the zirconia contant of a PSZ powder, e.g., as the solvent polarity increases more zirconium sulfate remains in solution.

TABLE VI

| EFFECT OF DIFFERENT SOLVENTS ON PSZ PARTICLE SIZE | | | | |
|---|---|---|---|---|
| EXAMPLE | SOLVENT | BULK MOLE % $Y_2O_3$ IN POWDER | Y LEVEL IN SOLVENT (μm/ml) | Zr LEVEL IN SOVENT (μm/ml) | PARTICLE MORPHOLOGY |
| 1 | Ethanol | 5.0 | 0.4 | 128 | Submicron Spheres |
| 16 | Methanol | 6.5 | — | — | Submicron Spheres |
| 17 | Isopropanol | 4.9 | 0.3 | 90 | Submicron Spheres |
| 18 | n-Butanol | 4.8 | 0.5 | 34 | Caked Powder |
| 19 | Acetone | 6.0 | — | 222 | 1-4 μm Fused Masses |

COMPARATIVE EXAMPLE

EXAMPLE 20

To 50 ml water was added 7. 1g zirconium sulfate tetrahydrate and 0.6g yttrium sulfate octahydrate. This solution was filtered through a 0.2 μm filter and then added rapid dropwise into 0.5 L ethanol. The ethanol solution was mechanically stirred during this process. A white precipiate was formed. The precipitate was collected by filtration and was washed with 0.5 L acetone. The precipitate was dried for 1 hour at 120° C. and then calcined in air at 750° C. for 2 hours. The product was a white powder of 1 mole % $Y_2O_3$—$ZrO_2$. The powder was spherical with an average particle size of 214 nm as determined by quasielastic light scattering.

COMPARATIVE EXAMPLE

EXAMPLE 21

To 35 ml methanol was added 8.6 g zirconium nitrate pentahydrate and 0.8 g yttrium hexahydrate. This solution was added dropwise into 0.4 L chloroform. The chloroform was ultrasonicated during the process. A white precipitate was formed. The precipitate was collected by filtration and dried for 1 hour at 120° C. and then calcined for 2 hours at 750° C. The product was a white powder of 1 to 5 μm size particles as determined by SEM.

COMPARATIVE EXAMPLE

EXAMPLE 22

To 15 ml water was added 11.1 g zirconium acetate and 0.7 g yttrium acetate. This solution was added dropwise into 0.3 L acetone. The acetone was ultrasonicated during the process. A white precipitate was formed. The precipitate was collected by filtration and washed with 0.3 L acetone. The precipitate was dried for 1 hour and 120° C. and then calcined for 2 hours at 750° C. The product was a white powder of 1 to 10 μm size particles as determined by SEM.

What is claimed is:

1. A process for making a fully or a partially stabilized zirconia comprising:
   (a) making an aqueous solution of zirconium sulfate in admixture with an inorganic or organic water soluble salt of one or more metals selected from the group consisting of Be, Mg, Ca, Sr, Ba, Ra, Sc, Y, La, Ac, Ce, Th, and Al, said organic salt having from about 1 to about 20 carbon atoms;
   (b) atomizing said solution into a solvent at least partially miscible with water, said solvent present in an amount of at least 3 times the volume of said solution wherein the ratio of said solvent to said solution is about 3:1 to about 50:1, based on volume, said solvent being agitated during the addition of said solution, forming a coprecipitated metal salt;
   (c) separating the coprecipitated metal salt from said solvent by filtration;
   (d) washing the coprecipitated metal salt filtrate with an inert solvent or solvents;
   (e) drying the washed filtrate; and
   (f) calcining the dried filtrate in a flowing gas or mixture of gases.

2. A process of claim 1 wherein deionized, distilled, or millipore filtered water is used for said solution of (a) and wherein said coprecipitated metal salt is separated from said solvent by filtration.

3. A process of claim 1 wherein said solution of (a) is made by:
   (i) dissolving said zirconium sulfate in deionized, distilled or millipore filtered water to form a zirconium sulfate solution;
   (ii) filtering said solution of (i) through a filter having pore sizes of about 0.2 to about 3 μm;
   (iii) dissolving said organic or inorganic salt in deionized, distilled or millipore filtered water to form a salt solution;
   (iv) filtering said solution of (iii) through a filter having pore sizes of about 0.2 to about 3 μm;
   (v) mixing together said solutions of (ii) and (iv) to form said solution of (a).

4. A process of claim 1 wherein said solution of (a) has about 1 to about 2.5 moles/liter of zirconium sulfate and about 0.01 to about 0.5 moles/liter of said metal salt.

5. A process of claim 1 wherein said solution of (a) is filtered through a filter having a pore size of about 0.2 to about 3 μm before atomizing.

6. A process of claim 1 wherein said atomizing is by a pressure nozzle or ultrasonic nozzle.

7. A process of claim 1 wherein said solvent to solution ratio is about 5:1 to about 20:1.

8. A process of claim 1 wherein said solvent is agitated by mechanical stirring, magnetic stirring or by ultrasound.

9. A process of claim 1 wherein said solvent is selected from the group consisting of alcohols having from about 1 to about 8 carbon atoms and mixtures thereof, acetone, and tetrahydrofuran.

10. A process of claim 9 wherein said alcohol is selected from the group consisting of methanol, ethanol, propanol, isopropanol, n-butanol, isobutanol, and sec-butanol.

11. A process of claim 1 having the additional step of adding additional solvent to maintain water to solvent ratio of about 1:3 to about 1:50.

12. A process of claim 1 wherein said inert solvent of (d) is acetone.

13. A process of claim 1 wherein said inert solvent of (d) is acetone and toluene individually used sequentially with the first use of the sequence being acetone.

14. A process of claim 1 wherein said separated coprecipitated metal salt is dried at a temperature of about 120° C.

15. A process of claim 1 wherein said dried coprecipitated metal salt is calcined at a temperature of about 750° C. utilizing air as the flowing gas.

16. A process of claim 1 wherein said inorganic salt is selected from the group consisting of oxides, sulfates, chlorides, and nitrates; and said organic salt is selected from the group consisting of: citrates, formates, and acetates.

17. A process of claim 1 wherein
   (i) deionized, distilled, or millipore filtered water is utilized for said solution of (a);
   (ii) said solution of (i) has about 1 to about 2.5 moles/liter of zirconium sulfate and about 0.01 to about 0.5 moles/liter of said metal salt;
   (iii) said solution of (ii) is filtered through a filter having pore sizes of about 0.2 to about 3 μm before atomizing;
   (iv) said ratio of said solvent to said solution of (iii) is about 5:1 to about 20:1, said solvent being at least partially miscible with water, said solvent being agitated by mechanical stirring, magnetic stirring or ultrasound, said atomizing being by a pressure or a ultrasonic nozzle;
   (v) additional solvent is added at a rate to maintain a water to solvent ratio of about 1:5 to about 1:20;
   (vi) said separated coprecipitated salt is washed with acetone;
   (vii) said washed coprecipitated metal salt is dried at about 120° C. for about 1 to 2 hours; and
   (viii) said dried coprecipitated metal salt is calcined at about 750° C. utilizing flowing air.

18. A process of claim 17 wherein the coprecipitated metal salt is separated by filtration.

19. A process of claim 17 wherein said solvent is selected from the group consisting of alcohols having from 1 to about 8 carbon atoms and mixtures thereof, chloroform, acetone, and tetrahydrofuran; and the metal salt is selected from the group consisting of oxides, sulfates, chlorides, formates, citrates, and acetates.

20. A process of claim 19 wherein said metal salt is selected from the group consisting of yttrium sulfates, calcium formates, calcium citrates, magnesium citrates, magnesium formates and magnesium sulfates.

21. A process of claim 19 wherein said metal salt is a yttrium sulfate and said solvent is ethanol.

22. A process of claim 19 wherein said metal salt is a yttrium sulfate and said solvent is methanol.

23. A process of claim 19 wherein said metal salt is a yttrium sulfate and said solvent is isopropanol.

24. A process of claim 19 wherein said metal salt is a yttrium sulfate and said solvent is selected from the group consisting of n-butanol and acetone.

25. A process of claim 19 wherein said metal salt is calcium formate and said solvent is isopropanol.

* * * * *

UNITED STATES PATENT OFFICE
CERTIFICATE OF CORRECTION

Patent No. 4,639,356    Dated  January 27, 1987

Inventor(s)  Michael P. O'Toole and Roger J. Card

It is certified that error appears in the above-identified patent and that said Letters Patent are hereby corrected as shown below:

In the Claims:

Column 8, Line 18    Change "7.1 lg" to read --7.1g--.

Column 8, line 31    Change the first sentence to read:

--The product was a white powder of 5 mole % $Y_2O_3$-$ZrO_2$.--

Signed and Sealed this

Twenty-fourth Day of November, 1987

*Attest:*

DONALD J. QUIGG

*Attesting Officer*    *Commissioner of Patents and Trademarks*